(12) United States Patent
Liu (10) Patent No.: US 8,509,577 B2
(45) Date of Patent: Aug. 13, 2013

(54) FIBEROPTIC DEVICE WITH LONG FOCAL LENGTH GRADIENT-INDEX OR GRIN FIBER LENS

(75) Inventor: Yu Liu, Irvine, CA (US)

(73) Assignee: St. Jude Medical, Inc., St Paul, MN (US)

( * ) Notice: Subject to any disclaimer, the term of this patent is extended or adjusted under 35 U.S.C. 154(b) by 378 days.

(21) Appl. No.: 12/829,787

(22) Filed: Jul. 2, 2010

(65) Prior Publication Data

US 2012/0002919 A1 Jan. 5, 2012

(51) Int. Cl.
*G02B 6/26* (2006.01)

(52) U.S. Cl.
USPC .................... 385/27; 385/33; 385/34; 385/39

(58) Field of Classification Search
USPC ......................................... 385/27–28, 33–34
See application file for complete search history.

(56) References Cited

U.S. PATENT DOCUMENTS

| | | | |
|---|---|---|---|
| 5,457,759 A * | 10/1995 | Kalonji et al. | 385/31 |
| 6,542,665 B2 | 4/2003 | Reed et al. | |
| 6,891,984 B2 | 5/2005 | Petersen et al. | |
| 7,920,763 B1 * | 4/2011 | Shou et al. | 385/33 |
| 2003/0165292 A1 | 9/2003 | Bhagavatula et al. | |
| 2005/0220401 A1 * | 10/2005 | Jiang et al. | 385/28 |

FOREIGN PATENT DOCUMENTS

| | | |
|---|---|---|
| DE | 10 2007 045 570 A1 | 4/2009 |
| EP | 1 380 864 A1 | 1/2004 |
| WO | 2005/114284 A1 | 12/2005 |
| WO | 2009/040158 A1 | 4/2009 |

OTHER PUBLICATIONS

William L Emkey, et al., Analysis and Evaluation of Graded-Index Fiber-Lenses, Journal of Lightwave Technology, IEEE, Service Center, New York, NY, US, Sep. 1, 1987, pp. 1156-1164, vol. LT-5, No. 9, XP000601806.

Reed et al., "Gradient-index fiber-optic microprobes for minimally invasive in vivo low-coherence interferometry", Oct. 15, 2002, pp. 1794-1796, vol. 27, No. 20, Optics Letters, Optical Society of America.

* cited by examiner

*Primary Examiner* — Eric Wong
(74) *Attorney, Agent, or Firm* — Mattingly & Malur, PC (57) ABSTRACT

Embodiments of the invention provide a fiberoptic device that uses a gradient-index (GRIN) lens for focusing a light beam emitted by an optical fiber, but achieves a substantially longer focal length than that of a GRIN lens alone by placing a beam expander (e.g., no core fiber or step-index multimode fiber) between the terminal end of the optical fiber and the GRIN lens to simulate free space therebetween. In one embodiment, a fiberoptic device comprises an optical fiber having a fiber core and an end through which a light beam emits from the fiber core; a beam expander having a first end coupled to the end of the optical fiber and having a second end, the beam expander permitting the light beam emitting from the fiber core to pass from the first end to the second end and to expand from the first end to a larger size at the second end; and a gradient-index fiber lens coupled to the second end of the beam expander to receive the light beam from the beam expander and focus the light beam.

21 Claims, 5 Drawing Sheets

|         | index | NA at 1/e^2 | Angle (Degree) | Full angle (Degree) | NA at 1% | Angle (Degree) | Full angle (Degree) |
|---------|-------|-------------|----------------|---------------------|----------|----------------|---------------------|
| in air    | 1     | 0.09        | 5.16           | 10.33               | 0.14     | 8.05           | 16.10               |
| in water  | 1.33  | 0.09        | 3.88           | 7.76                | 0.14     | 6.05           | 12.09               |
| in glass  | 1.467 | 0.09        | 3.52           | 7.03                | 0.14     | 5.48           | 10.96               |

| LBE (mm) | um  | n0    | NA   | n1    | NA2  | D(um) | delta    | Diameter (um) | f (mm) | experiment (mm) |
|----------|-----|-------|------|-------|------|-------|----------|---------------|--------|-----------------|
| 0        | 8.5 | 1.467 | 0.09 | 1.487 | 0.29 | 100   | 0.019017 | 39.96         | 0.38   | 0.35            |
| 0.65     |     |       |      |       |      |       |          | 87.00         | 1.78   | 1.5             |

FIBEROPTIC DEVICE WITH LONG FOCAL LENGTH GRADIENT-INDEX OR GRIN FIBER LENS

BACKGROUND OF THE INVENTION

The present invention relates generally to fiberoptic devices and, more specifically, to fiberoptic devices with long focal length GRIN (gradient-index or graded refractive index) fiber lens.

A GRIN lens has a refractive index whose value varies with radial distance from the axis of the lens. The nontrivial variation in refractive index causes light refraction and gives the GRIN lens focusing capabilities. See, e.g., U.S. Pat. No. 6,542,665, the entire disclosure of which is incorporated herein by reference. Many optical devices use lenses to focus, collimate, or expand light beams. When a GRIN fiber is cut into a specific length, the short length GRIN fiber can focus a light beam. For example, when a GRIN lens is fused to a terminal end of an optical fiber, it can focus the light beam emitted by the optical fiber. See, e.g., William A. Reed et al., "Gradient-index fiber-optic microprobes for minimally invasive in vivo low-coherence interferometry," Optics Letters, Vol. 27, No. 20, Oct. 15, 2002, the entire disclosure of which is incorporated herein by reference. However, the focus length of the GRIN lens is very short (typically around 0.35 mm), which seriously restricts its applications.

BRIEF SUMMARY OF THE INVENTION

In various applications such as OCT (Optical Coherence Tomography) imaging for imaging biological tissue or the like, it is desirable to achieve a relatively long focal length that is longer than that provided by a GRIN lens.

Exemplary embodiments of the invention provide a fiberoptic device that uses a GRIN lens for focusing a light beam emitted by an optical fiber, but achieves a substantially longer focal length than that of a GRIN lens alone by placing a beam expander between the terminal end of the optical fiber and the GRIN lens to simulate free space therebetween.

In accordance with an aspect of the present invention, a fiberoptic device comprises an optical fiber having a fiber core and an end through which a light beam emits from the fiber core; a beam expander having a first end coupled to the end of the optical fiber and having a second end, the beam expander permitting the light beam emitting from the fiber core to pass from the first end to the second end and to expand from the first end to a larger size at the second end; and a gradient-index fiber lens coupled to the second end of the beam expander to receive the light beam from the beam expander and focus the light beam.

In some embodiments, the optical fiber is a single mode fiber. The beam expander comprises a solid piece of glass such as, for example, a no core fiber (NCF) or a piece of step-index multimode fiber (SI-MMF). The gradient-index fiber lens has a core surrounded by a cladding, the core having a refractive index that varies with a radial distance from an axis of the gradient-index fiber lens, decreasing radially outwardly toward the cladding. The gradient-index fiber lens has a refractive index profile expressed as $$n(\rho) = \begin{cases} n_{1,grin}\sqrt{1-2(\rho/a)^2 \Delta} & (\rho \leq a) \\ n_{2,grin} & (\rho > a) \end{cases}$$

where $\alpha$ is a radius of the core of the gradient-index fiber lens, $n_{1,grin}$ is a refractive index of the core of the gradient-index fiber lens, and $n_{2,grin}$ is a refractive index of the cladding of the gradient-index fiber lens, $0 \leq \rho \leq \alpha$ represents a radius of light trace, and a parameter $\Delta$ is expressed as $$\Delta = \frac{n_{1,grin}^2 - n_{2,grin}^2}{2n_{1,grin}^2} = \frac{NA_{grin}^2}{2n_{1,grin}^2}$$

where $NA_{grin}$ is a numerical aperture of the gradient-index fiber lens.

In specific embodiments, the core of the gradient-index fiber lens has a diameter $D_{grin}$, which is not larger than an outer diameter of the beam expander. The core of the gradient-index fiber lens has a diameter $D_{grin}$; and the beam expander has a length between the first end and the second end, $L_{BE}$, which is determined by $$D_1 = D_{core} + 2L_{BE}\tan(\theta_{BE})$$

where $D_1$ is a beam diameter which is approximately equal to the diameter $D_{grin}$ of the gradient-index fiber lens, the optical fiber has a cladding and a core with a core diameter of $D_{core}$, and $\theta_{BE}$ is a divergent angle of the light beam exiting the optical fiber. Furthermore, $$\theta_{BE} = a\sin(NA/n_{BE})$$

where $n_{BE}$ is a refractive index of the beam expander, and NA is a numerical aperture of the optical fiber, $NA = \sqrt{n_1^2 - n_2^2}$, $n_1$ is a refractive index of the core of the optical fiber, and $n_2$ is a refractive index of the cladding of the optical fiber. The gradient-index fiber lens focuses the light beam with a range of focal length f which is approximated by an expression $$f < \left(1 - \frac{1}{e^2}\right)^2 \frac{1}{2.44\lambda} \left[\frac{NA}{n_0\sqrt{2\Delta}} D_{grin} + D_{core}\right]^2$$

$$\Delta = \frac{n_{1,grin}^2 - n_{2,grin}^2}{2n_{1,grin}^2} = \frac{NA_{grin}^2}{2n_{1,grin}^2}$$

where $n_{1,grin}$ is a refractive index of the core of the gradient-index fiber lens, and $n_{2,grin}$ is a refractive index of the cladding of the gradient-index fiber lens, $NA_{grin}$ is a numerical aperture of the gradient-index fiber lens, $\lambda$ is a wavelength of the light beam in vacuum, and $$A = 1 - \frac{1}{e^2} \approx 86.5\%.$$

For a given focal length f and a given $D_{core}$, the expression is used to estimate $D_{grin}$.

In accordance with another aspect of the invention, a device for focusing a light beam emitting from an end of an optical fiber comprises a beam expander having a first end to be coupled to the end of the optical fiber and having a second end, the beam expander permitting the light beam emitting from the optical fiber to pass from the first end to the second end and to expand from the first end to a larger size at the second end; and a gradient-index fiber lens coupled to the second end of the beam expander to receive the light beam from the beam expander and focus the light beam.

In accordance with another aspect of the invention, a fiberoptic device comprises an optical fiber having a fiber core and an end through which a light beam emits from the fiber core; means coupled to the end of the optical fiber for emulating free space thereby allowing the light beam to expand from the fiber core at the end of the optical fiber to a larger size; and a gradient-index fiber lens coupled to the means for emulating free space to receive the larger size light beam and focus the light beam.

In accordance with another aspect of the invention, a fiberoptic device comprises an optical fiber having a fiber core and an end through which a light beam emits from the fiber core; a beam expander having a first end coupled to the end of the optical fiber and having a second end, the beam expander permitting the light beam emitting from the fiber core to pass from the first end to the second end and to expand from the first end to a larger size at the second end, the beam expander comprising a step-index multimode fiber; and a gradient-index fiber lens coupled to the second end of the beam expander to receive the light beam from the beam expander and focus the light beam.

These and other features and advantages of the present invention will become apparent to those of ordinary skill in the art in view of the following detailed description of the specific embodiments.

DETAILED DESCRIPTION OF THE INVENTION

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

In the following description, relative orientation and placement terminology, such as the terms horizontal, vertical, left, right, top and bottom, is used. It will be appreciated that these terms refer to relative directions and placement in a two dimensional layout with respect to a given orientation of the layout. For a different orientation of the layout, different relative orientation and placement terms may be used to describe the same objects or operations.

Exemplary embodiments of the invention, as will be described in greater detail below, provide apparatuses and methods for using a GRIN lens to focus a light beam emitted by an optical fiber with the help of a beam expander between the terminal end of the optical fiber and the GRIN lens to achieve a substantially longer focal length than that of a GRIN lens alone.

Figure 1:
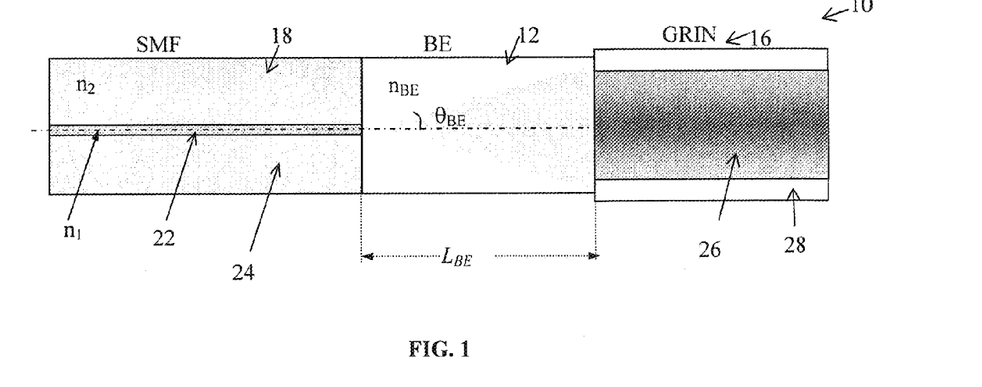
FIG. 1 is a cross-sectional view of a fiberoptic device in which a beam expander and a GRIN lens are placed at the end of an optical fiber.

FIG. 1 is a cross-sectional view of a fiberoptic device 10 in which a beam expander 12 and a GRIN lens 16 are coupled to the end of an optical fiber 18. In specific embodiments, the beam expander 12 is spliced between the end of the optical fiber 18 and the GRIN lens 16. Of course, any suitable way of coupling the beam expander 12 with the optical fiber 18 on one side and the GRIN lens 16 on the other side may be employed. In FIG. 1, the beam expander 12, GRIN lens 16, and optical fiber 18 are co-axial when they are fused together by using a fusion splicer. In the embodiment shown, they have similar or equal outer diameters. In other embodiments, they may have different outer diameters, as discussed below. The length of the beam expander 12 and the length of the GRIN lens 16 are selected to achieve the desired focal length, as described in detail below.

The optical fiber 18 has a fiber core 22 surrounded by a cladding 24. The core size of the fiber core 22 is selected in part based on a single mode operation for the wavelength of the light beam. Standard telecommunication optical fibers which have core diameters of ~9 μm may be used. The cladding 24 is typically made of pure silicon and the fiber core 22 typically is made largely of silicon doped with a germanium concentration to raise the refractive index to form a waveguide. In specific embodiments, the optical fiber 18 is a single mode fiber with a core diameter of about 8-10 μm and a cladding diameter of about 125±2 μm.

The beam expander 12 is a solid fiber with preferably uniform and constant properties to emulate free space. Examples of a beam expander include no core fiber (NCF) and step-index multimode fiber (SI-MMF). A NCF has no doped core and is typically a solid piece of glass or pure silica fiber. A SI-MMF has a core with a constant refractive index and a cladding of slightly lower refractive index surrounding the core, and the core is used as a beam expander. The beam expander 12 allows the light beam to expand or diverge to a desirable size before the light beam reaches the GRIN lens 16. The length of the beam expander 12 determines the amount of expansion of the light beam for a given divergent angle $\theta_{BE}$, and is selected to achieve the desired expansion. Advantageously, because the beam expander-12 (e.g., NCF or SI-MMF) is spliced to both the optical fiber 18 and the GRIN lens 16, it is automatically aligned and no mechanical fitting is required to align the beam expander 12 axially with the optical fiber 18 and the GRIN lens 16. Besides a solid piece of glass, other examples of emulating free space include the placement of another medium or material with preferably uniform and constant properties between the optical fiber 18 and the GRIN fiber lens 16. To provide an actual free space occupied by air, a mechanical fixture is needed to align the optical fiber 18 and the GRIN fiber lens 16 and to fix their relative positions. The use of a solid beam expander 12 is more desirable than air for several reasons. The solid beam expander 12 provides better temperature stability, there is no need to provide wavelength related coating on the optical fiber 18 and the GRIN fiber lens 16 to reduce surface reflections since splicing a solid beam expander 12 between the two automatically reduces surface reflection by better than 60 dB for all wavelength, which is difficult to achieve by antireflection coating, and the solid beam expander 12 (e.g., NCF or SI-MMF) is automatically aligned with both the optical fiber 18 and the GRIN lens 16 during manufacturing. Nonetheless, it is understood that a variety of other materials and mediums may be used to emulate free space between the optical fiber 18 and the GRIN lens 16 to achieve a longer focal length in accordance with the present invention.

The GRIN lens 16 has a circular cylindrical core 26 and an annular cladding 28. In the core 26, the refractive index varies with the radial distance from the axis of the GRIN lens 16. Typically, the core refractive index decreases almost parabolically and radially outwardly toward the cladding 28. In the cladding 28, the refractive index is constant and has a lower value than in the core 26. For beam focusing, the GRIN lens 16 is referred to as an axial GRIN lens with flat surfaces that can focus light just as a normal lens with curved surfaces does.

1. Focal Length

Figure 2:
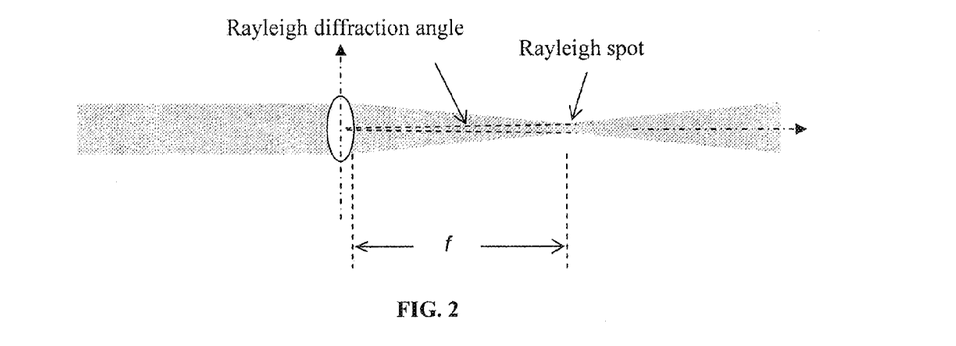
FIG. 2 illustrates an optical schematic of a parallel beam focused by a lens.

FIG. 2 illustrates an optical schematic of a parallel beam focused by a lens. A parallel beam can be focused by a lens and the size of the focal point is normally determined by the aberration of lenses. For a no aberration ideal lens, the light diffraction plays the main role and needs to be considered. The well-known Rayleigh diffraction angle is expressed as $$\Delta\delta \approx \frac{1.22\lambda}{A \cdot D} \tag{1}$$

The full divergent angle is then 2Δδ, where D is the light beam diameter, $$A = 1 - \frac{1}{e^2} \approx 86.5\%$$

is used to count the effective beam diameter when the intensity reduces to 13.5% of the maximum intensity, and λ is the light wavelength in vacuum. The geometry convergent angle of the focused beam is simply calculated as $$\Delta\theta \approx \frac{A \cdot D/2}{f} \tag{2}$$

In Eq. (2), f is the focal length, the distance between focal point and the main plane of lenses. Clearly, the convergent angle must be larger than the divergent Rayleigh angle (Δθ>Δδ). The range of the focal length is then obtained as $$f < \left(1 - \frac{1}{e^2}\right)^2 \frac{D^2}{2.44\lambda} \tag{3}$$

2. Divergent Angle of Single Mode Fiber

Figure 3:
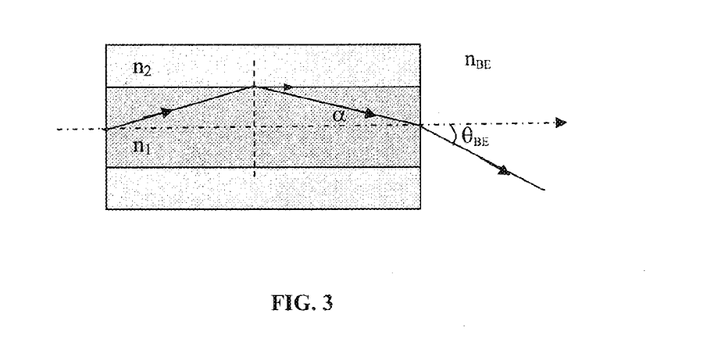
FIG. 3 illustrates an optical schematic of a light emitting from a single mode fiber.

FIG. 3 illustrates an optical schematic of a light emitting from a single mode fiber, which is a step-index single mode fiber. The core and cladding indexes are $n_1$ and $n_2$, respectively. When a light beam is emitting from a fiber core at an angle of $\theta_{BE}$, and the diffraction light is incident onto the boundary of fiber core and cladding at a critical angle, the two reflection equations are expressed as $$\begin{cases} n_{BE}\sin(\theta_{BE}) = n_1\sin(\alpha) \\ n_1\cos(\alpha) = n_2 \end{cases} \tag{4}$$

Simplifying the above equations produces the following $$\sqrt{n_1^2 - n_2^2} = n_{BE}\sin(\theta_{BE}) \tag{5}$$

NA=$\sqrt{n_1^2 - n_2^2}$ is defined as the single mode fiber (SMF) numerical aperture, and the divergent angle of the emitting beam is obtained as $$\theta_{BE} = a\sin(NA/n_{BE}) \tag{6}$$

Figure 4:
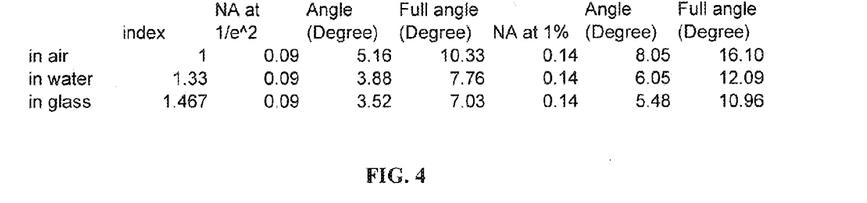
FIG. 4 is a table showing the divergent angles of a light beam emitting from a single mode fiber passing through different materials.

For a standard telecommunication fiber, this angle is listed in the table shown in FIG. 4, which lists the divergent angles of a light beam emitting from a single mode fiber passing through different materials. Note that the numerical for fiber Corning SM28 is 0.14 when the intensity reduces to 1%, while it is only 0.09 at $1/e^2$. When the single mode fiber is spliced onto a short length beam expander, the beam diameter $D_1$ at the end face of the beam expander, as shown in FIG. 3, is calculated as $$D_1 = D_{core} + 2L_{BE}\tan(\theta_{BE}) \tag{7}$$

wherein $D_{core}$ is the core diameter of the single mode optical fiber 18, and $L_{BE}$ is the length of the beam expander.

3. Gradient-Index (GRIN) Lens

Figure 5:
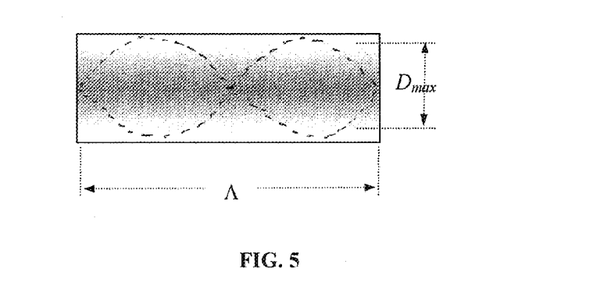
FIG. 5 illustrates an optical schematic of lights propagation along a GRIN fiber, showing periodical beam focusing.
Figure 6:
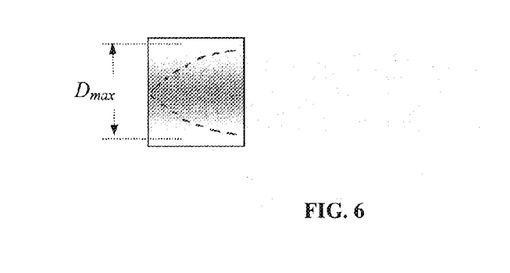
FIG. 6 illustrates an optical schematic of lights propagating along a GRIN fiber, showing that a quarter period length could collimate a beam into a parallel beam if the diffraction could be ignored.

FIG. 5 illustrates an optical schematic of lights propagation along a GRIN fiber, showing periodical beam focusing. FIG. 6 illustrates an optical schematic of lights propagating along a GRIN fiber, showing that a quarter or three quarters period length can collimate a beam into a parallel beam if the diffraction can be ignored. If the incident beam is a point size, the $$\left(\frac{k}{2}+\frac{1}{4}\right)\Lambda$$

length is theoretically the best length for the GRIN lens to collimator a beam, where k=0, 1, 2, ... Λ is the period of the GRIN fiber. Because an actual incident beam has a significant beam diameter rather than a point source, the actual length to use for the GRIN fiber will be shorter than the quarter period. It is worth to note that since the period (Λ) is related to the incident angle, a large number k will significantly degrade the performance of the focusing. When the incident beam is close in size to the diameter of GRIN fibers, simulations and experiments show that the length of the GRIN fiber to use will be much shorter than the quarter period length (k=0).

The index profile of a GRIN fiber is usually expressed as $$n(\rho) = \begin{cases} n_{1,grin}\sqrt{1-2(\rho/a)^2\Delta} & (\rho \leq a) \\ n_{2,grin} & (\rho > a) \end{cases} \quad (8)$$

where a, $n_{1,grin}$ and $n_{2,grin}$ are the radius of the fiber, and indexes of core and cladding, respectively. $0 \leq \rho \leq a$ represents the radius of light trace. The parameter Δ is expressed as $$\Delta = \frac{n_{1,grin}^2 - n_{2,grin}^2}{2n_{1,grin}^2} = \frac{NA_{grin}^2}{2n_{1,grin}^2} \quad (9)$$

where $NA_{grin}$ is the numerical aperture of the GRIN fiber. When a light is incident into the core of the GRIN fiber at an angle of $\theta_0$, this light will turn its direction (θ=0) at the maximum radius and light equation is expressed as $$n_{1,grin}\cos(\theta_0) = n_{1,grin}\sqrt{1-2(\rho_{max}/a)^2\Delta} \quad (10)$$

In general, the radius of the light incident at an angle of θ with respect to the axial position (z) can be expressed as $$\rho(z) = \frac{a\sin(\theta)}{\sqrt{2\Delta}}\sin\left[2\pi \cdot z / \frac{2\pi a \cos(\theta)}{\sqrt{2\Delta}}\right] \quad (11)$$

where, $-\theta_0 \leq \theta \leq \theta_0$ describes the range of the incident angle. Clearly, Eq. (11) shows that the GRIN fiber can periodically focus the incident beam. The period is expressed as $$\Lambda = \frac{2\pi a \cos(\theta)}{\sqrt{2\Delta}} \quad (-\theta_0 \leq \theta \leq \theta_0) \quad (12)$$

Since the period is related to the incident angle, the self focusing effect will wash out by averaging ($-\theta_0 \leq \theta \leq \theta_0$) when the length of GRIN fiber is longer than $L_{max}$ as $$L_{max} = \frac{\pi \cdot n_{1,grin}}{NA_{grin}} \frac{\cos\theta_0}{1-\cos\theta_0} D_{GRIN} \quad (13)$$

For typical parameters of $D_{GRIN}$=100 μm, $\theta_0$=8°, $NA_{grin}$=0.29, $n_{1,grin}$=1.47, Eq. (13) gives $L_{max}$~160 mm. Considering a Gaussian profile power distribution with respect to the incident angle, the real maximum length is slightly longer than this value.

When $$z = \left(\frac{k}{2}+\frac{1}{4}\right)\Lambda,$$

the maximum radius is obtained from Eq. (11) as $$\rho_{max} = \frac{a\sin(\theta_0)}{\sqrt{2\Delta}} \quad (14)$$

Eq. (14) agrees with the value given by Eq. (10).

Considering the fiber diameter $D_{core}$, and substituting Eq. (5) into Eq. (14), the maximum diameter $D_{max}=2\rho_{max}+D_{core}$ is then obtained as $$D_{max} = \frac{NA}{n_0\sqrt{2\Delta}} D_{grin} + D_{core} \quad (15)$$

where $D_{grin}$ is the GRIN fiber core diameter. Substituting Eq. (6) and Eq. (15) into Eq. (3), the focal length of GRIN lenses without the beam expander is obtained as $$f < \left(1 - \frac{1}{e^2}\right)^2 \frac{1}{2.44\lambda}\left(\frac{NA}{n_0\sqrt{2\Delta}} D_{grin} + D_{core}\right)^2 \quad (16)$$

Figure 7:
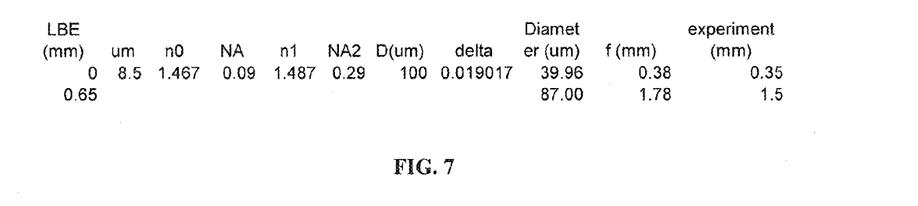
FIG. 7 is a table showing experimental results of the focal length for a GRIN fiber spliced onto a single mode fiber and the focal length for a GRIN fiber having a no core fiber as a beam expander spliced between the GRIN fiber and a single mode fiber.

FIG. 7 is a table showing experimental results of the focal length for a GRIN fiber spliced onto a single mode fiber and the focal length for a GRIN fiber having a beam expander spliced between the GRIN fiber and a single mode fiber. For the fibers with parameters of NA=0.09, $NA_{grin}$=0.29, $n_{1,grin}$=1.487, $D_{grin}$=100 μm, the maximum beam diameter is about 40 μm when a single mode fiber is spliced onto a GRIN fiber. The focal length is obtained from Eq. (16) as 0.38 mm, which explains why the longest focal length is always around 0.35 mm in experiments. Experiments also show that the focal length is slightly longer for a single mode fiber with slightly larger NA, which agrees with Eq. (16).

In order to obtain a long focal length, the effective way as shown in Eq. (3) is to expand the beam diameter by splicing a short piece of beam expander (e.g., NCF or SI-MMF) between the single mode fiber and the GRIN fiber as a free space. When a 0.65 mm long no core fiber is spliced between the GRIN fiber and the single mode fiber, the beam diameter is given by Eq. (7) as 87 μm, and Eq. (3) gives a theoretical focal length of 1.78 mm. A focal length of 1.76 mm is obtained in experiment, which agrees with theoretical calculation, is the longest experimental focal length achieved to the inventor's knowledge and which is substantially longer than the experimental focal length of 0.35 mm obtained without the no core fiber.

Figure 8:
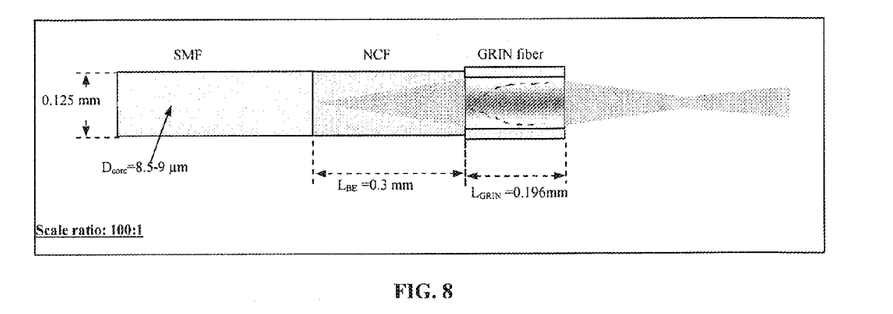
FIG. 8 is a schematic illustration of an example of a fiberoptic device in which the dimensions of a no core fiber as a beam expander and a GRIN lens that are placed at the end of an optical fiber are selected to achieve a certain long focal length.
Figure 9:
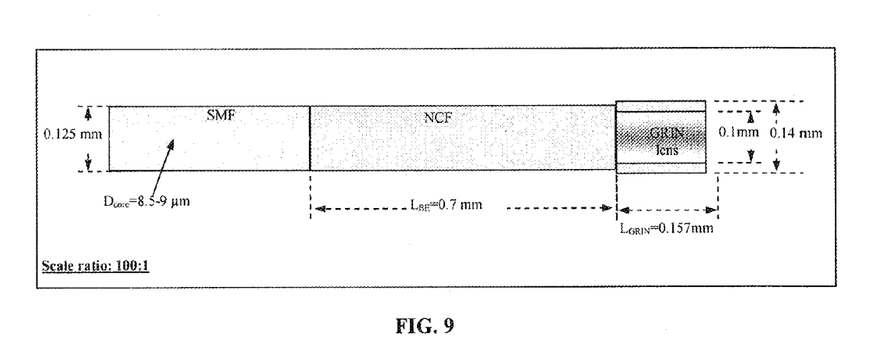
FIG. 9 is a schematic illustration of another example of a fiberoptic device in which the dimensions of a no core fiber as beam expander and a GRIN lens that are placed at the end of an optical fiber are selected to achieve a different long focal length.

FIG. 8 is a schematic illustration of an example of a fiberoptic device in which the dimensions of a no core fiber and a GRIN lens that are placed at the end of an optical fiber are selected to achieve a certain long focal length. FIG. 9 is a schematic illustration of another example of a fiberoptic device in which the dimensions of a no core fiber and a GRIN lens that are placed at the end of an optical fiber are selected to achieve a different long focal length. In the configuration of FIG. 9, the length of the no core fiber, $L_{NCF}$, is 0.65 mm and the length of the GRIN fiber is 0.17 mm. This produces the experimental result shown in FIG. 10(b) of a long focal length equal to 1.76 mm. In the configuration of FIG. 8, the length of the no core fiber is 0.3 mm instead of 0.65 mm, while the length of the GRIN fiber is 0.26 mm instead of 0.17 mm. The measured focal length for the configuration of FIG. 8 is 0.62 mm, which is smaller than the focal length of 1.76 mm for the configuration of FIG. 9 because the beam diameter is smaller for the shorter no core fiber in FIG. 8. When the length of the no core fiber, the diameters of the GRIN fiber, and the no core fiber are doubled, the theoretical focal length would be increased by four times, could be a few millimeters long. For large dimension fibers, a special designed fusion splicer rather than the regular one may have to be used.

Figure 10:
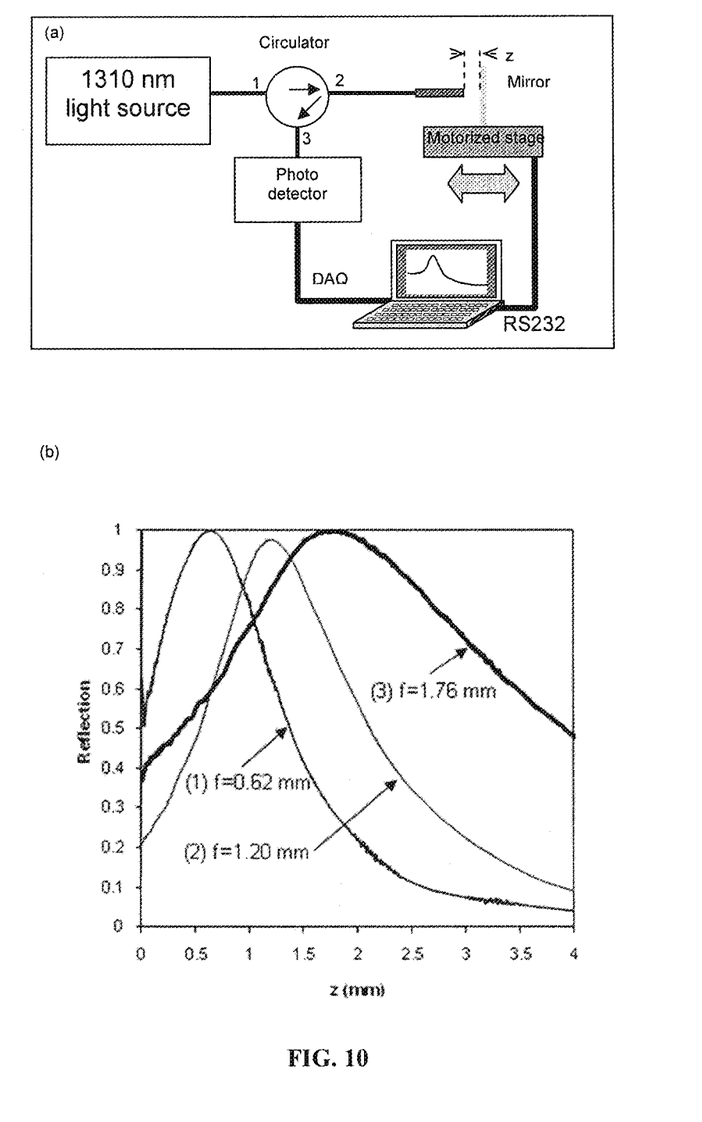
FIG. 10(a) is a diagram of measurement setup for power reflection.
FIG. 10(b) illustrates the measured power reflection with respect to the distance between a mirror and the GRIN fiber lens for three different configurations, including the fiberoptic device of FIG. 9.

FIG. 10 (a) illustrates the measurement setup for power reflection, and FIG. 10(b) shows the measured power reflection with respect to the distance between a mirror and the GRIN fiber lens for three different configurations, including the fiberoptic devices of FIG. 8 and FIG. 9. As seen in FIG. 10(b), the maximum power reflection is measured. The 1.76 mm focal length has been achieved when the lengths of no core fiber and GRIN fiber are 0.65 mm and 0.17 mm, respectively. The measured power reflection with respect to the distance between a mirror and the GRIN fiber lens is shown for: (1) f=0.62 mm for LBE=0.3 mm, LGRIN=0.26 mm; (2) f=1.21 mm for LBE=0.6 mm, LGRIN=0.19 mm; (3) f=1.76 mm for LBE=0.65 mm, LGRIN=0.17 mm.

The manufacturing process of the fiberoptic device may employ a mechanical system that renders it repeatable. After splicing a no core fiber onto the optical fiber, the mechanical system cuts the no core fiber to the required length and then splices a GRIN fiber onto the no core fiber. Finally, the mechanical system cuts the GRIN fiber to the specified length. The mechanical system may be employed a computer-controlled motor and a digital microscope to accurately determine the length.

For a given focal length f and a given core diameter $D_{core}$ of the optical fiber, Eq. (3) can be used to estimate the GRIN fiber core diameter $D_{grin}$. It is a theoretical estimate that has been shown to be within about 20% of the actual experimental value. Eq. (7) can then be used to estimate the length $L_{BE}$ (in this case $L_{NCF}$) of the no core fiber by assuming that the beam diameter $D_1$ is approximately equal to the GRIN core diameter $D_{grin}$. For OCT imaging, a focal length of about 3 mm may be desirable. The above procedure can be used to estimate the dimensions of the no core fiber and GRIN fiber lens.

Figure 11:
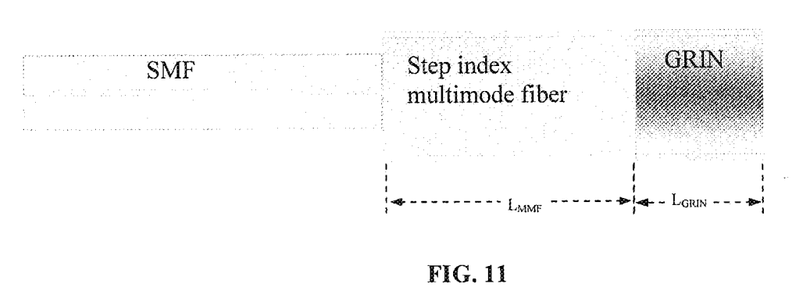
FIG. 11 is a schematic illustration of an example of a fiberoptic device in which the dimensions of a large core step-index multimode fiber and a GRIN lens that are placed at the end of an optical fiber are selected to achieve a very long focal length.

FIG. 11 is a schematic illustration of an example of a fiberoptic device in which the dimensions of a large core step-index multimode fiber and a GRIN lens that are placed at the end of an optical fiber are selected to achieve a very long focal length. Either a no core fiber (NCF) or a step-index multimode fiber (SI-MMF) can be used as beam expander to expand the beam size before the GRIN lens. The NCF has a diameter that is equal to or larger than (typically slightly larger than) the GRIN core diameter. Likewise, the SI-MMF has a core diameter that is equal to or larger than (typically slightly larger than) the GRIN core diameter. When a typical core/cladding diameters of 200/220 μm SI-MMF is used to expand the beam and a core diameter of 200 μm GRIN fiber is used to fabricate GRIN lenses, the focal length could be a few millimeters long (e.g., about 7 mm).

In the description, numerous details are set forth for purposes of explanation in order to provide a thorough understanding of the present invention. However, it will be apparent to one skilled in the art that not all of these specific details are required in order to practice the present invention. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A fiberoptic device comprising:
   an optical fiber having a fiber core and an end through which a light beam emits from the fiber core;
   a beam expander having a first end coupled to the end of the optical fiber and having a second end, the beam expander permitting the light beam emitting from the fiber core to pass from the first end to the second end and to expand from the first end to a larger size at the second end; and
   a gradient-index fiber lens coupled to the second end of the beam expander to receive the light beam from the beam expander and focus the light beam;
   wherein the gradient-index fiber lens has a core with a diameter $D_{grin}$;
   wherein the beam expander has a length between the first end and the second end, $L_{BE}$, which is determined by $$D_1 = D_{core} + 2L_{BE} \tan(\theta_{BE})$$

where $D_1$ is a beam diameter of the light beam at the second end of the beam expander and is approximately equal to the diameter $D_{grin}$ of the gradient-index fiber lens, the optical fiber has a cladding and the fiber core has a core diameter of $D_{core}$, and $\theta_{BE}$ is a divergent angle of the light beam exiting the optical fiber;
   wherein $$\theta_{BE} = a \sin(NA/n_{BE})$$

where $n_{BE}$ is a refractive index of the beam expander, and NA is a numerical aperture of the optical fiber, $NA = \sqrt{n_1^2 - n_2^2}$, $n_1$ is a refractive index of the fiber core of the optical fiber, and $n_2$ is a refractive index of the cladding of the optical fiber; and
   wherein the second end of the beam expander has a larger size than the core diameter of the fiber core of the optical fiber to allow the light beam from the fiber core to expand within the beam expander from the first end to the second end.

2. The fiberoptic device of claim 1,
   wherein the optical fiber is a single mode fiber.

3. The fiberoptic device of claim 1,
   wherein the beam expander comprises a non-doped core of a no core fiber.

4. The fiberoptic device of claim 1,
   wherein the core of the gradient-index fiber lens is surrounded by a cladding, the core having a refractive index that varies with a radial distance from an axis of the gradient-index fiber lens, decreasing radially outwardly toward the cladding.

5. The fiberoptic device of claim 4, wherein the gradient-index fiber lens has a refractive index profile expressed as $$n(\rho) = \begin{cases} n_{1,grin}\sqrt{1-2(\rho/a)^2\Delta} & (\rho \leq a) \\ n_{2,grin} & (\rho > a) \end{cases}$$

where $a$ is a radius of the core of the gradient-index fiber lens, $n_{1,grin}$ is a refractive index of the core of the gradient-index fiber lens, and $n_{2,grin}$ is a refractive index of the cladding of the gradient-index fiber lens, $0 \leq \rho \leq a$ represents a radius of light trace, and a parameter $\Delta$ is expressed as $$\Delta = \frac{n_{1,grin}^2 - n_{2,grin}^2}{2n_{1,grin}^2} = \frac{NA_{grin}^2}{2n_{1,grin}^2}$$

where $NA_{grin}$ is a numerical aperture of the gradient-index fiber lens.

6. The fiberoptic device of claim 1,
wherein the core of the gradient-index fiber lens has a diameter $D_{grin}$, which is not larger than an outer diameter of the beam expander.

7. The fiberoptic device of claim 1,
wherein the gradient-index fiber lens focuses the light beam with a range of focal length f which is approximated by an expression $$f < \left(1 - \frac{1}{e^2}\right)^2 \frac{1}{2.44\lambda}\left[\frac{NA}{n_0\sqrt{2\Delta}}D_{grin} + D_{core}\right]^2$$

$$\Delta = \frac{n_{1,grin}^2 - n_{2,grin}^2}{2n_{1,grin}^2} = \frac{NA_{grin}^2}{2n_{1,grin}^2}$$

where $n_{1,grin}$ is a refractive index of the core of the gradient-index fiber lens, and $n_{2,grin}$ is a refractive index of the cladding of the gradient-index fiber lens, $NA_{grin}$ is a numerical aperture of the gradient-index fiber lens, $\lambda$ is a wavelength of the light beam in vacuum, and $$A = 1 - \frac{1}{e^2} \approx 86.5\%;$$

and
wherein for a given focal length f and a given $D_{core}$, the expression is used to estimate $D_{grin}$.

8. A device for focusing a light beam emitting from an end of an optical fiber, the device comprising:
a beam expander having a first end to be coupled to the end of the optical fiber and having a second end, the beam expander permitting the light beam emitting from the optical fiber to pass from the first end to the second end and to expand from the first end to a larger size at the second end; and
a gradient-index fiber lens coupled to the second end of the beam expander to receive the light beam from the beam expander and focus the light beam;
wherein the gradient-index fiber lens has a core with a diameter $D_{grin}$;

wherein the beam expander has a length between the first end and the second end, $L_{BE}$, which is determined by $$D_1 = D_{core} + 2L_{BE}\tan(\theta_{BE})$$

where $D_1$ is a beam diameter of the light beam at the second end of the beam expander and is approximately equal to the diameter $D_{grin}$ of the gradient-index fiber lens, the optical fiber has a cladding and a core with a core diameter of $D_{core}$, and $\theta_{BE}$ is a divergent angle of the light beam exiting the optical fiber;
wherein $$\theta_{BE} = a\sin(NA/n_{BE})$$

where $n_{BE}$ is a refractive index of the beam expander), and NA is a numerical aperture of the optical fiber, $NA = \sqrt{n_1^2 - n_2^2}$, $n_1$ is a refractive index of the core of the optical fiber, and $n_2$ is a refractive index of the cladding of the optical fiber; and
wherein the second end of the beam expander has a larger size than the core diameter of the fiber core of the optical fiber to allow the light beam from the fiber core to expand within the beam expander from the first end to the second end.

9. The device of claim 8,
wherein the beam expander comprises a non-doped core of a no core fiber.

10. The device of claim 8,
wherein the core of the gradient-index fiber lens is surrounded by a cladding, the core having a refractive index that varies with a radial distance from an axis of the gradient-index fiber lens, decreasing radially outwardly toward the cladding.

11. The device of claim 10, wherein the gradient-index fiber lens has a refractive index profile expressed as $$n(\rho) = \begin{cases} n_{1,grin}\sqrt{1-2(\rho/a)^2\Delta} & (\rho \leq a) \\ n_{2,grin} & (\rho > a) \end{cases}$$

where $a$ is a radius of the core of the gradient-index fiber lens, $n_{1,grin}$ is a refractive index of the core of the gradient-index fiber lens, and $n_{2,grin}$ is a refractive index of the cladding of the gradient-index fiber lens, $0 \leq \rho \leq a$ represents a radius of light, and a parameter $\Delta$ is expressed as $$\Delta = \frac{n_{1,grin}^2 - n_{2,grin}^2}{2n_{1,grin}^2} = \frac{NA_{grin}^2}{2n_{1,grin}^2}$$

where $NA_{grin}$ is a numerical aperture of the gradient-index fiber lens.

12. The device of claim 8,
wherein the core of the gradient-index fiber lens has a diameter $D_{grin}$, which is not larger than an outer diameter of the beam expander.

13. The device of claim 8,
wherein the gradient-index fiber lens focuses the light beam with a range of focal length f which is approximated by an expression $$f < \left(1 - \frac{1}{e^2}\right)^2 \frac{1}{2.44\lambda}\left[\frac{NA}{n_0\sqrt{2\Delta}}D_{grin} + D_{core}\right]^2$$

-continued $$\Delta = \frac{n_{1,grin}^2 - n_{2,grin}^2}{2n_{1,grin}^2} = \frac{NA_{grin}^2}{2n_{1,grin}^2}$$

where $n_{1,grin}$ is a refractive index of the core of the gradient-index fiber lens, and $n_{2,grin}$ is a refractive index of the cladding of the gradient-index fiber lens, $NA_{grin}$ is a numerical aperture of the gradient-index fiber lens, $\lambda$ is a wavelength of the light beam in vacuum, and $$A = 1 - \frac{1}{e^2} \approx 86.5\%;$$

and
wherein for a given focal length f and a given $D_{core}$, the expression is used to estimate $D_{grin}$.

14. A fiberoptic device comprising:
an optical fiber having a fiber core and an end through which a light beam emits from the fiber core;
means coupled to the end of the optical fiber for emulating free space thereby allowing the light beam to expand from the fiber core at the end of the optical fiber to a larger size; and
a gradient-index fiber lens coupled to the means for emulating free space to receive the larger size light beam and focus the light beam;
wherein the gradient-index fiber lens has a core with a diameter $D_{grin}$;
wherein the means for emulating free space has a length between a first end coupled to the end of the optical fiber and a second end coupled to the gradient-index fiber lens, $L_{BE}$, which is determined by $$D_1 = D_{core} + 2L_{BE}\tan(\theta_{BE})$$

where $D_1$ is a beam diameter of the light beam at the second end of the means for emulating free space and is approximately equal to the diameter $D_{grin}$ of the gradient-index fiber lens, the optical fiber has a cladding and the fiber core has a core diameter of $D_{core}$, and $\theta_{BE}$ is a divergent angle of the light beam exiting the optical fiber;
wherein $$\theta_{BE} = a\sin(NA/n_{BE})$$

where $n_{BE}$ is a refractive index of the means for emulating free space as beam expander, and NA is a numerical aperture of the optical fiber, $NA = \sqrt{n_1^2 - n_2^2}$, $n_1$ is a refractive index of the core of the optical fiber, and $n_2$ is a refractive index of the cladding of the optical fiber; and
wherein the second end of the means for emulating free space has a larger size than the core diameter of the fiber core of the optical fiber to allow the light beam from the fiber core to expand within the means for emulating free space from the first end to the second end.

15. The fiberoptic device of claim 14,
wherein the optical fiber is a single mode fiber.

16. The fiberoptic device of claim 14,
wherein the core of the gradient-index fiber lens is surrounded by a cladding, the core having a refractive index that varies with a radial distance from an axis of the gradient-index fiber lens, decreasing radially outwardly toward the cladding; and
wherein the gradient-index fiber lens has a refractive index profile expressed as $$n(\rho) = \begin{cases} n_{1,grin}\sqrt{1 - 2(\rho/a)^2\Delta} & (\rho \leq a) \\ n_{2,grin} & (\rho > a) \end{cases}$$

where $a$ is a radius of the core of the gradient-index fiber lens, $n_{1,grin}$ is a refractive index of the core of the gradient-index fiber lens, and $n_{2,grin}$ is a refractive index of the cladding of the gradient-index fiber lens, $0 \leq \rho \leq a$ represents a radius of light trace, and a parameter $\Delta$ is expressed as $$\Delta = \frac{n_{1,grin}^2 - n_{2,grin}^2}{2n_{1,grin}^2} = \frac{NA_{grin}^2}{2n_{1,grin}^2}$$

where $NA_{grin\,grin}$ is a numerical aperture of the gradient-index fiber lens.

17. The fiberoptic device of claim 14,
wherein the gradient-index fiber lens focuses the light beam with a range of focal length f which is approximated by an expression $$f < \left(1 - \frac{1}{e^2}\right)^2 \frac{1}{2.44\lambda}\left[\frac{NA}{n_0\sqrt{2\Delta}}D_{grin} + D_{core}\right]^2$$

$$\Delta = \frac{n_{1,grin}^2 - n_{2,grin}^2}{2n_{1,grin}^2} = \frac{NA_{grin}^2}{2n_{1,grin}^2}$$

where $n_{1,grin}$ is a refractive index of the core of the gradient-index fiber lens, and $n_{2,grin}$ is a refractive index of the cladding of the gradient-index fiber lens, $NA_{grin}$ is a numerical aperture of the gradient-index fiber lens, $\lambda$ is a wavelength of the light beam in vacuum, and $$A = 1 - \frac{1}{e^2} \approx 86.5\%;$$

and
wherein for a given focal length f and a given $D_{core}$, the expression is used to estimate $D_{grin}$.

18. A fiberoptic device, comprising:
an optical fiber having a fiber core and an end through which a light beam emits from the fiber core;
a beam expander having a first end coupled to the end of the optical fiber and having a second end, the beam expander permitting the light beam emitting from the fiber core to pass from the first end to the second end and to expand from the first end to a larger size at the second end, the beam expander comprising a core of a step-index multimode fiber (SI-MMF); and
a gradient-index fiber lens coupled to the second end of the beam expander to receive the light beam from the beam expander and focus the light beam;
wherein the second end of the core of the SI-MMF has a larger size than a core diameter of the fiber core of the optical fiber to allow the light beam from the fiber core to expand within the core of the SI-MMF from the first end to the second end;
wherein the gradient-index fiber lens has a core surrounded by a cladding, the core having a refractive index that varies with a radial distance from an axis of the gradient-index fiber lens, decreasing radially outwardly toward the cladding; and wherein the gradient-index fiber lens has a refractive index profile expressed as $$n(\rho) = \begin{cases} n_{1,grin}\sqrt{1-2(\rho/a)^2\Delta} & (\rho \leq a) \\ n_{2,grin} & (\rho > a) \end{cases}$$

where $a$ is a radius of the core of the gradient-index fiber lens, $n_{1,grin}$ is a refractive index of the core of the gradient-index fiber lens, and $n_{2,grin}$ is a refractive index of the cladding of the gradient-index fiber lens, $0 \leq \rho \leq a$ represents a radius of light trace, and a parameter $\Delta$ is expressed as $$\Delta = \frac{n_{1,grin}^2 - n_{2,grin}^2}{2n_{1,grin}^2} = \frac{NA_{grin}^2}{2n_{1,grin}^2}$$

where $NA_{grin}$ is a numerical aperture of the gradient-index fiber lens.

19. A fiberoptic device of claim 18, comprising:
an optical fiber having a fiber core and an end through which a light beam emits from the fiber core;
a beam expander having a first end coupled to the end of the optical fiber and having a second end, the beam expander permitting the light beam emitting from the fiber core to pass from the first end to the second end and to expand from the first end to a larger size at the second end, the beam expander comprising a core of a step-index multimode fiber (SI-MMF); and
a gradient-index fiber lens coupled to the second end of the beam expander to receive the light beam from the beam expander and focus the light beam;
wherein the second end of the core of the SI-MMF has a larger size than a core diameter of the fiber core of the optical fiber to allow the light beam from the fiber core to expand within the core of the SI-MMF from the first end to the second end;
wherein the core of the gradient-index fiber lens has a diameter $D_{grin}$;
wherein the beam expander has a length between the first end and the second end, $L_{BE}$, which is determined by $$D_1 = D_{core} + 2L_{BE}\tan(\theta_{BE})$$

where $D_1$ is a beam diameter of the light beam at the second end of the beam expander and is approximately equal to the diameter $D_{grin}$ of the gradient-index fiber lens, the optical fiber has a cladding and the fiber core has a core diameter of $D_{core}$, and $\theta_{BE}$ is a divergent angle of the light beam exiting the optical fiber;
wherein $$\theta_{BE} = a\sin(NA/n_{BE})$$

where $n_{BE}$ is a refractive index of the beam expander, and NA is a numerical aperture of the optical fiber, $NA = \sqrt{n_1^2 - n_2^2}$, $n_1$ is a refractive index of the core of the optical fiber, and $n_2$ is a refractive index of the cladding of the optical fiber;
wherein the gradient-index fiber lens focuses the light beam with a range of focal length f which is approximated by an expression $$f < \left(1 - \frac{1}{e^2}\right)^2 \frac{1}{2.44\lambda}\left[\frac{NA}{n_0\sqrt{2\Delta}}D_{grin} + D_{core}\right]^2$$

$$\Delta = \frac{n_{1,grin}^2 - n_{2,grin}^2}{2n_{1,grin}^2} = \frac{NA_{grin}^2}{2n_{1,grin}^2}$$

where $n_{1,grin}$ is a refractive index of the core of the gradient-index fiber lens, and $n_{2,grin}$ is a refractive index of the cladding of the gradient-index fiber lens, $NA_{grin}$ is a numerical aperture of the gradient-index fiber lens, $\lambda$ is a wavelength of the light beam in vacuum, and $$A = 1 - \frac{1}{e^2} \approx 86.5\%;$$

and p1 wherein for a given focal length f and a given $D_{core}$, the expression is used to estimate $D_{grin}$.

20. The device of claim 8,
wherein the beam expander comprises a core of a step-index multimode fiber.

21. The fiberoptic device of claim 1,
wherein the beam expander comprises a core of a step-index multimode fiber.

* * * * *